United States Patent [19]
Depp et al.

[11] Patent Number: 5,979,390
[45] Date of Patent: Nov. 9, 1999

[54] ASSEMBLY FOR TRANSMITTING ROTATIONAL MOVEMENTS AND FOR DAMPING TORSIONAL VIBRATIONS

[75] Inventors: Jürgen Depp, Michelstadt, Germany; Michael Forkel, Ahlen, Austria; Heinrich Winkelmann, Jr., Ahlen; Michael Jung, Hofstetten, both of Germany

[73] Assignees: Palsis Schwingungstechnik GmbH & Co., Ahlen; Audi AG, Ingolstadt, both of Germany

[21] Appl. No.: 08/865,256

[22] Filed: May 29, 1997

[30] Foreign Application Priority Data

May 29, 1996 [DE] Germany .................... 196 21 460

[51] Int. Cl.⁶ ........................ F16F 15/00; F02B 75/06
[52] U.S. Cl. ........................ 123/192.1; 74/573 F
[58] Field of Search ............... 123/192.1, 192.2, 123/90.17; 74/572, 574, 573 F, 573 R

[56] References Cited

U.S. PATENT DOCUMENTS

| | | | |
|---|---|---|---|
| 2,198,135 | 4/1940 | Strasburg et al. | 74/574 |
| 2,636,399 | 4/1953 | O'Connor | 74/574 |
| 2,824,467 | 2/1958 | O'Connor | 74/574 |
| 3,640,149 | 2/1972 | McLean | 74/574 |
| 4,172,510 | 10/1979 | Forkel | 188/379 |
| 4,872,369 | 10/1989 | Critton et al. | 74/574 |
| 4,884,666 | 12/1989 | Stahl | 188/378 |
| 5,058,453 | 10/1991 | Graham et al. | 74/574 |
| 5,579,665 | 12/1996 | Mott et al. | 74/574 |
| 5,611,416 | 3/1997 | Berger et al. | 192/58.42 |
| 5,720,205 | 2/1998 | Harrington et al. | 74/573 F |
| 5,749,269 | 5/1998 | Szymanski et al. | 74/574 |

Primary Examiner—Henry C. Yuen
Assistant Examiner—Hai Huynh
Attorney, Agent, or Firm—Brown & Wood, LLP

[57] ABSTRACT

An assembly for transmitting rotational movements and for damping torsional vibration and including a damper housing, a connection section located radially inward of the damper housing for attaching the assembly to a to-be-damped part, with the connection section being formed integrally with the housing as a one-piece part, a cover for sealingly closing the housing and a damping weight located in the working chamber which is formed in the housing, in a viscose medium filling the working chamber, with the assembly being formed as a camshaft gear, and with the radial outer circumference of the housing being formed as a camshaft gear toothing.

4 Claims, 2 Drawing Sheets

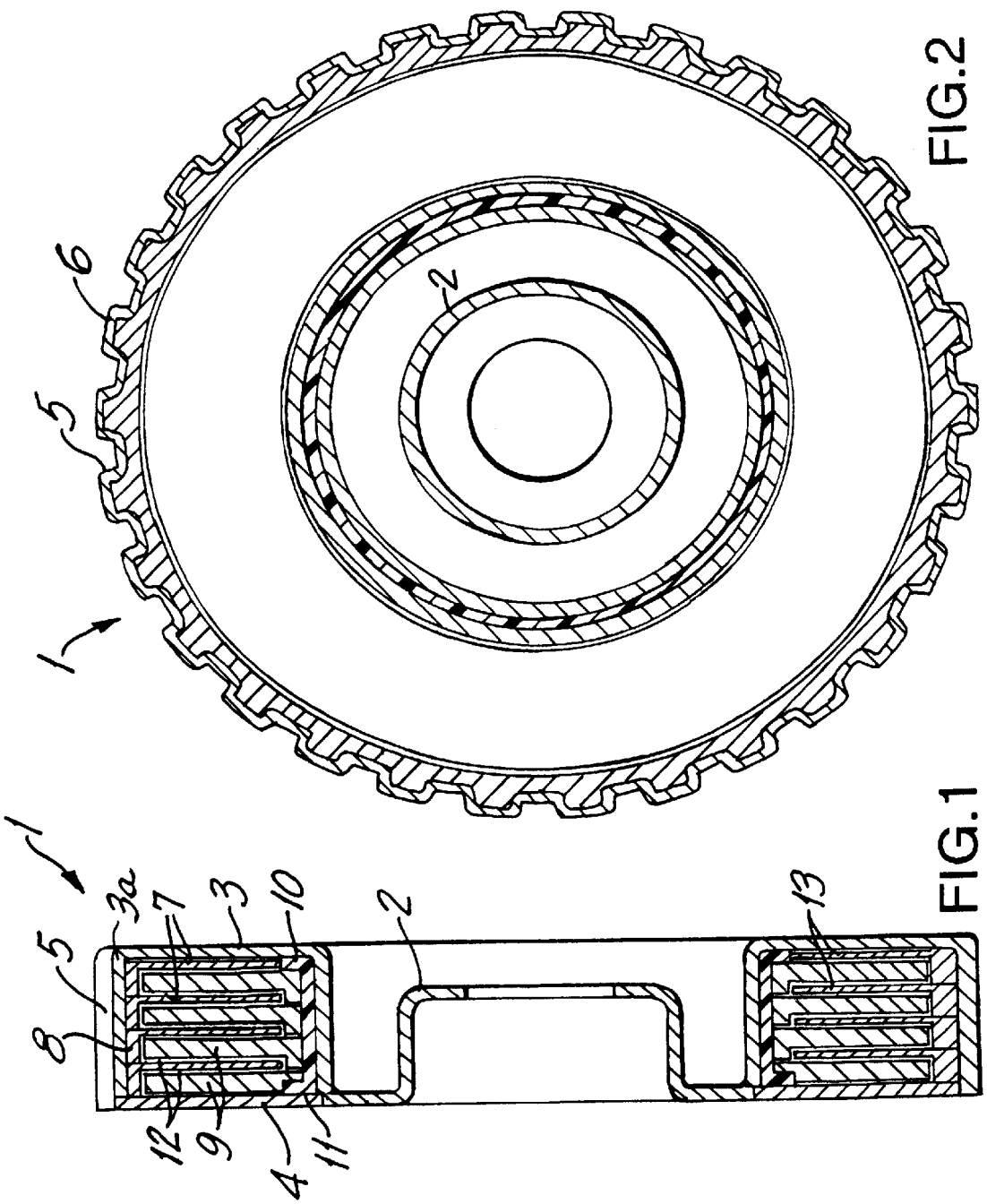

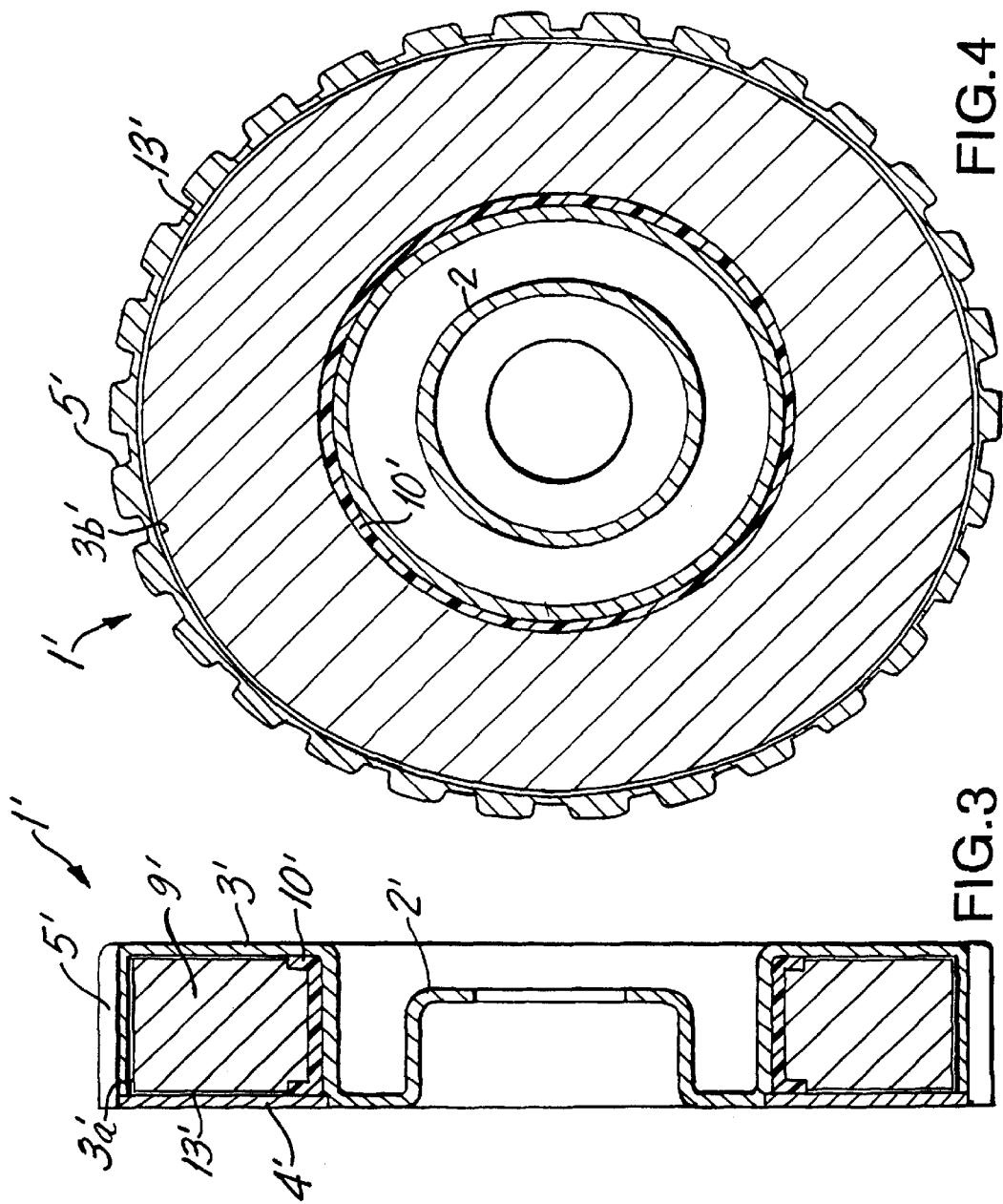

5,979,390

ASSEMBLY FOR TRANSMITTING ROTATIONAL MOVEMENTS AND FOR DAMPING TORSIONAL VIBRATIONS

BACKGROUND OF THE INVENTION

1. Field of the Invention

The present invention relates to an assembly for transmitting rotational movements and for damping torsional vibrations and which includes a damper housing, a connection section located radially inward of the damper housing for attaching the assembly to a to-be-damped part, with the connection section being formed integrally with the housing as a one-piece part, a cover for sealingly closing the housing and which defines with the housing a working chamber, and a damping weight located in the working chamber in a viscose medium filling the working chamber.

2. Description of the Prior Art

An assembly of a type described above is disclosed in European Patent No. 0 503 424 B1. This patent discloses a torsional vibration damper connected with a belt pulley and designed for use as a crankshaft damper. This assembly, except the damping weight and the damping housing cover, is formed as a single part having a pulley element, damper housing and hub region and which is preferably manufactured by a non-chipping process. This assembly represents a so-called viscose damper which is based on a shear flow of a fluid in an annular clearance between an oscillating weight and a housing provided at a free end of the crankshaft. The freely rotatable oscillating weight, as a result of its rotational inertia, is retarded in its rotation relative to the housing. As a result, the shearing energy of the high viscose fluid absorbs the oscillations of the crankshaft, thus damping the vibrations.

The crankshaft torsional viscose vibration dampers include steel-rubber components the frequency of which is selected to coincide with the first oscillating frequency of the crankshaft to thereby minimize the crankshaft oscillation due to its amortization and damping.

While the use of torsional vibration dampers for crankshaft is conventional, it was not considered to be necessary to use dampers, in addition to those for crankshafts, for a drive train to a camshaft. It is, however, known to use viscose dampers when drives are use for adjusting of the camshaft in order to adapt the ignition points to different rotational regions. The camshafts, which are driven from the crankshafts via toothed belt, chain or gear drives, provide for valve control when internal combustion engines are used. Such a drive train represents a system with distributed masses and has points of different stability, the operation of which is subjected to oscillation due to the intermittent mode of operation of the internal combustion engines. Wide fluctuations of the rotational speeds of the engine are observed due to the intermittent action of the gas forces during combustion in separate cylinders. This is particularly observed at low rotational speeds. This so-called rotational non-uniformity causes a low-frequency rigid body vibration of the entire camshaft which, e.g., in four cylinder, four-stroke engines, results in two gas pulses per revolution. This results in an oscillation angle of the free end of the crankshaft and, thus, of the camshaft drive of ±3° and more, especially when the use of a multi-valve technique results in higher gas force pulses or when the mass inertia moment of a flywheel on the crankshaft is reduced by the use of two solid flywheels.

In addition, high frequency torsional vibrations are generated in the camshaft due to the acceleration and deceleration of valve masses. This effect is reinforced in diesel engines because of the drive of the injection pump from the camshaft. The multi-valve technique reinforces these vibrations even more.

Accordingly, an object of the present invention is to provide a damping assembly for a camshaft which would enable a simplified vibration damping of a camshaft, without the use of any adjusting means.

Another object of the present invention is to provide a camshaft vibration damping assembly having the smallest dimensions possible.

SUMMARY OF THE INVENTION

These and other objects of the present invention, which will become apparent hereinafter, are achieved by forming the damping assembly as a camshaft gear, preferably by non-chipping technique, with the outer circumference of the damper housing being formed as a camshaft gear toothing.

The present invention permits to integrate an vibration damping mechanism of a viscose damper into a camshaft gear, without forming a complicated and, therefore, difficult to produce assembly. The assembly can advantageously be produced by non-chipping processes which reduce manufacturing costs. Because of the integration of the viscose damper into the camshaft gear, the vibration damping mechanism requires very little constructional space.

According to a particular preferred embodiment of the present invention, it is contemplated to form the inner side of the camshaft gear toothing as an internal toothing extending into the working chamber in which at least one outer lamella, extending radially inward, is received, with the damping weight being formed as at least one inner lamella extending radially outward. At that, it is advantageous to use several inner and outer lamellas arranged alternatively relative to each other. The outer lamellas, which are form-lockingly received in the internal toothing, form, together with the freely rotatable inner lamellas, a plurality of annular clearances which are filled with viscose fluid. By utilizing a lamella construction, the operational surface of the annular clearances is substantially increased in comparison with a conventional construction, without increasing the dimension of the oscillating weight. This makes possible, on one hand, to obtain the same damping characteristics with the use of a fluid having a lower viscosity and/or, on the other hand, to increase the manufacturing tolerances of the clearances (which enables the utilization of non-chipping manufacturing processes).

Because the inner lamellas serve as an oscillating weight, they are made wider than the outer lamellas and, advantageously, are formed of steel. The outer lamellas are made much thinner and are formed, advantageously, of aluminum or a plastic material.

To insure an adequate dimensions of the annular clearances, axial spacers are provided between the lamellas. The spacers can be integrated into the lamellas or made with respective lamellas as one-piece parts.

According to another embodiment of the present invention, the inner side of the camshaft gear toothing, which limits the working chamber, is formed as a smooth annular surface, with the oscillating weight being formed as a ring-shaped member. In this embodiment, a conventional oscillating weight can be used, the essential being that the inner side of the camshaft gear toothing is formed as a smooth annular surface.

It is further advantageously contemplated to use a slide bearing support for axial and radial support of the oscillating weight. The slide bearing support can be formed of separate bearing shells or be formed as a coating, e.g., of a Teflon® material. This slide bearing support should not in any way limit the rotational movement of the inner lamellas. However, it should provide for additional friction damping.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 is an axial cross-sectional view of a first embodiment of an assembly for transmitting rotational movements and for damping of torsional vibrations according to the present invention;

FIG. 2 is a radial cross-sectional view of the assembly shown in FIG. 1;

FIG. 3 is an axial cross-sectional view of a second embodiment of an assembly according to the present invention; and FIG. 4 is a radial cross-sectional view of the assembly shown in FIG. 3.

DETAILED DESCRIPTION OF THE PREFERRED EMBODIMENTS

As mentioned above, FIGS. 1 and 2 show a first embodiment of an assembly for transmitting rotational movements and for damping torsional vibrations according to the present invention, which is formed as a camshaft gear 1. The camshaft gear 1 has a hub-shaped connection region 2 for mounting the camshaft gear 1 on a camshaft of a motor vehicle or the like. The hub-shaped connection region 2 passes into a damper housing 3 having a U-shaped cross-section. The damper housing 3 has its open sides sealingly closed with a disc-shaped cover 4, which is secured to the housing 3 by welding, gluing or the like. The damper housing 3, together with the cover 4, form a closed working chamber for receiving a torsional viscose vibration damper, the construction of which will be explained in details below. The axial outer wall 3a of the damper housing 3 is provided on its outer side with a camshaft gear toothing 5 which on its inner side is formed as an internal toothing 6 facing the working chamber. The camshaft gear 1, which is described above, is formed, except the cover 4, as a one-piece member which is preferably formed by a non-chipping process.

The internal toothing 6, which is provided on the inner side of the camshaft gear toothing 5, serves for form-lockingly receiving at least one, but preferably more (in the described embodiment-four) of extending radially inward, disc-shaped, spaced from each other, outer lamellas 7 which are thus secured in the working chamber of the damper housing 3 against rotation. To insure the spacing between the lamellas 7, there are provided in the base (bottom) regions of the lamellas 7 annual spacers 8. Alternatively, it is possible to form the spacers 8 as a single pieces insertable between lamellas 7.

The damping weight of viscose dampers is formed of at least one, preferably more (in the embodiment shown-four, extended radially outward, disc-shaped inner lamellas 9 which are arranged between the outer lamellas 7. The inner lamellas 9 are rotatably supported in the working chamber of the housing 3. To this end, there is provided in the working chamber a sliding bearing support 10 arranged on a radially inward side of the housing 3. The sliding bearing support 10 can be formed of separate bearing shells or as coating, e.g., of a Teflon®. The inner lamellas 9 are spaced from each other at their radially inner side by axial spacers 11 which are formed in the shown embodiment as an integral part of the inner lamellas 9. The spacers 8 and 11 insure that an annular clearance 12 of a constant width is maintained between the lamellas 7 and 9, respectively. After the installation of the lamellas and the closing of the housing 3 with the cover 4, the working chambers are filled in a known manner with a viscose fluid 13 which fills in particular the region of the annular clearances 12.

In comparison with a conventional construction of the viscose vibration dampers, providing of lamellas permits to increase the surface area of the operating clearance 12. Thereby it becomes possible to obtain the same damping effect with the use of a fluid having a lower viscosity, on one side, and/or to substantially increase the manufacturing tolerances of the clearances, on the other side.

As shown in FIG. 1, in order to provide an adequate damping weight, the inner lamellas 9 are formed noticeably wider than the outer lamellas 7. The inner lamellas 9 advantageously are formed of steel, whereas the outer lamellas 7 are formed of aluminum or a plastic material.

Another embodiment of camshaft gear is shown in FIGS. 3 and 4, where the same elements are designated with the same reference numerals as in FIGS. 1 and 2 but with an index "".

The camshaft gear 1', which is shown in FIGS. 3 and 4, differs from the camshaft gear 1, which is shown in FIGS. 1 and 2, in that the outer wall $3a^1$ of the damper housing $3^1$ has, on its outer side, a camshaft gear toothing $5^1$ the inner side $3b^1$ of which facing the working chamber is substantially ring-shaped and the damping weight $9^1$ is also ring-shaped. The damping weight $9^1$ is rotably arranged in the working chamber and is supported on its radially inner side in a slide support $10^1$. The working chamber is filled with a viscose fluid $13^1$.

Both embodiment provide a very compact assembly which does not practically increases the constructional dimensions of a camshaft gear and which can be easily mounted. Obviously, other modification are also possible, without departing form the spirit of the present invention. Thus, the number of lamellas in the embodiment of FIGS. 1 and 2 can be varied.

Accordingly, though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An assembly for transmitting rotational movements and for damping torsional vibrations, the assembly comprising:

a damper housing a connection section located radially inward of the damper housing for attaching the assembly to a to-be-damped part, the connection section being formed integrally with the housing as a one-piece part;

a cover for sealingly closing the housing and defining, together with a radial wall of the housing, a working chamber; and a damping weight located in the working chamber in a viscose medium filling the working chamber;

wherein the assembly is formed as a/camshaft gear, and an outer circumference of the radial wall of the housing is formed as a camshaft gear toothing which serves for transmitting a rotational movement, wherein the camshaft gear toothing has an annular smooth inner surface, and the damping weight is formed as a ring member.

2. An assembly as set forth in claim 1, further comprising a slide bearing support located in the working chamber for supporting the damping weight.

3. An assembly as set forth in claim 2, wherein the slide bearing support is formed of separate bearing shells.

4. An assembly as set forth in claim 2, wherein the slide bearing support is formed as a coating.

* * * * *